United States Patent [19]

Hatanaka et al.

[11] Patent Number: 4,965,570
[45] Date of Patent: Oct. 23, 1990

[54] PHOTOELECTRIC CONVERSION APPARATUS

[75] Inventors: Katsunori Hatanaka, Yokohama; Shunichi Uzawa, Tokyo; Katsumi Nakagawa, Nagahama; Toshiyuki Komatsu, Atsugi, all of Japan

[73] Assignee: Canon Kabushiki Kaisha, Tokyo, Japan

[21] Appl. No.: 388,713

[22] Filed: Aug. 2, 1989

Related U.S. Application Data

[63] Continuation of Ser. No. 251,029, Sep. 26, 1988, abandoned, which is a continuation of Ser. No. 8,943, Jan. 30, 1987, abandoned.

[30] Foreign Application Priority Data

Feb. 4, 1986 [JP] Japan ................................. 61-23284
Feb. 4, 1986 [JP] Japan ................................. 61-23285
Feb. 4, 1986 [JP] Japan ................................. 61-23286
Feb. 4, 1986 [JP] Japan ................................. 61-23287
Feb. 4, 1986 [JP] Japan ................................. 61-23288

[51] Int. Cl.$^5$ .............................................. H04Q 1/00
[52] U.S. Cl. ..................... 340/825.790; 340/425.800; 358/213.18
[58] Field of Search ................. 340/825.79–825.96; 382/58, 62; 250/200, 206; 358/213.11, 213.12, 213.15, 213.18

[56] References Cited

U.S. PATENT DOCUMENTS

| | | | |
|---|---|---|---|
| 3,946,151 | 3/1976 | Kamiyama et al. | 358/213.18 |
| 4,045,817 | 8/1977 | Nakatani et al. | 358/213.18 |
| 4,067,046 | 1/1978 | Nakatani et al. | 358/213.18 |
| 4,314,348 | 2/1982 | Carr. | |
| 4,456,929 | 6/1984 | Aoki et al. | 358/213.18 |
| 4,511,804 | 4/1985 | Ozawa. | |
| 4,575,638 | 3/1986 | Okumura. | |
| 4,634,886 | 1/1987 | Hatanaka et al. | 358/213.15 X |
| 4,644,287 | 2/1987 | Levine | 358/213.15 X |

FOREIGN PATENT DOCUMENTS 56-178975 5/1983 Japan.
2160058 12/1985 United Kingdom.

*Primary Examiner*—Ulysses Weldon
*Attorney, Agent, or Firm*—Fitzpatrick, Cella, Harper & Scinto

[57] ABSTRACT

A photoelectric conversion apparatus has a plurallity of photoelectric conversion elements each providing an output signal to a storage capacitor. A matrix wiring unit is arranged opposite the photoelectric conversion elements so as not to cross the signal lines extending from the capacitors. The matrix wiring unit matrix transfers the signals from the capacitors. A switch array unit includes a first switch unit for sequentially transferring the matrix transferred signals, and a first readout device for reading out, as a voltage signal, the signals transferred by the first switch section. The switch array also includes a second switch unit arranged in correspondence with the first switch unit and operated synchronously therewith. The second switch unit receives signals corresponding to noise. A second readout device reads out, as a voltage signal, the output from the second switch unit. A differential amplifier is included for receiving the outputs from the first and second readout devices and outputs a signal corresponding to a difference therebetween.

8 Claims, 6 Drawing Sheets

FIG. I
(PRIOR ART)

PHOTOELECTRIC COONVERSION APPARATUS

This application is a continuation, of application Ser. No. 251,029 filed Sept. 26, 1988, now abandoned, which is a continuation of Ser. No. 008,943, field Jan. 30, 1987, now abandoned.

BACKGROUND OF THE INVENTION

1. Field of the Invention

The present invention relates to a photoelectric conversion apparatus and, more particularly, to a photoelectric conversion apparatus having a switch array for converting a parallel input signal into a serial output signal.

2. Related Background Art

FIG. 1 is a circuit diagram schematically showing part of a conventional photoelectric conversion apparatus. Referring to FIG. 1 a photocurrent corresponding to an amount of incident line flows through photosensors $Si$ ($i=1, 2, \ldots, m$), and a charge is accumulated in a capacitor $Ci$. Subsequently, an H-level output is produced from a parallel output terminal $Qi$ of a shift register 702, and sequentially turns on an analog switch $SWti$. When the analog switch $SWti$ is turned on, the charge accumulated on the capacitor $Ci$ is discharged through a common signal line 701 and the current is amplified by an amplifier 703. The amplified current is then output.

In FIG. 1, a switch means for resetting the capacitors $Ci$ and the common signal line 701 is omitted. When the read access from the capacitor $Ci$ is completed, the common signal line 701 is reset, and read access from the next capacitor $Ci+1$ starts.

However, the conventional photoelectric conversion apparatus poses the following problems. Since a noise component due to a gate-source capacitance of the analog switch $SWti$ is output through the common signal line 701 and the amplifier 703, the S/N ratio of the serial output signal is impaired.

In such a conventional switch array apparatus, since the charge accumulated in the capacitor $Ci$ is read out as a current, the S/N ratio of the output signal is impaired by variations in conductance $gm$ of the analog switch $SWti$.

A noise component due to the gate-source capacitance of the analog switch $SWti$ has a spike-like waveform because of current read access, and has a much higher frequency component than that of a readout signal. Therefore, the noise component cannot be eliminated even if a differential amplifier is used. Thus, a satisfactory S/N ratio cannot be obtained.

In the conventional switch array apparatus, when an output is read from the photosensors $Si$, a low signal current from each photosensor must be transmitted to the amplifier 703 through the common signal line 701. Therefore, the S/N ratio of the readout signal is decreased.

SUMMARY OF THE INVENTION

It is an object of the present invention to provide a photoelectric conversion apparatus which is free from the conventional problems and can produce an output signal having an improved S/N ratio.

DETAILED DESCRIPTION OF THE PREFERRED EMBODIMENTS

An embodiment of the present invention will now be described with reference to the accompanying drawings.

Figure 2:
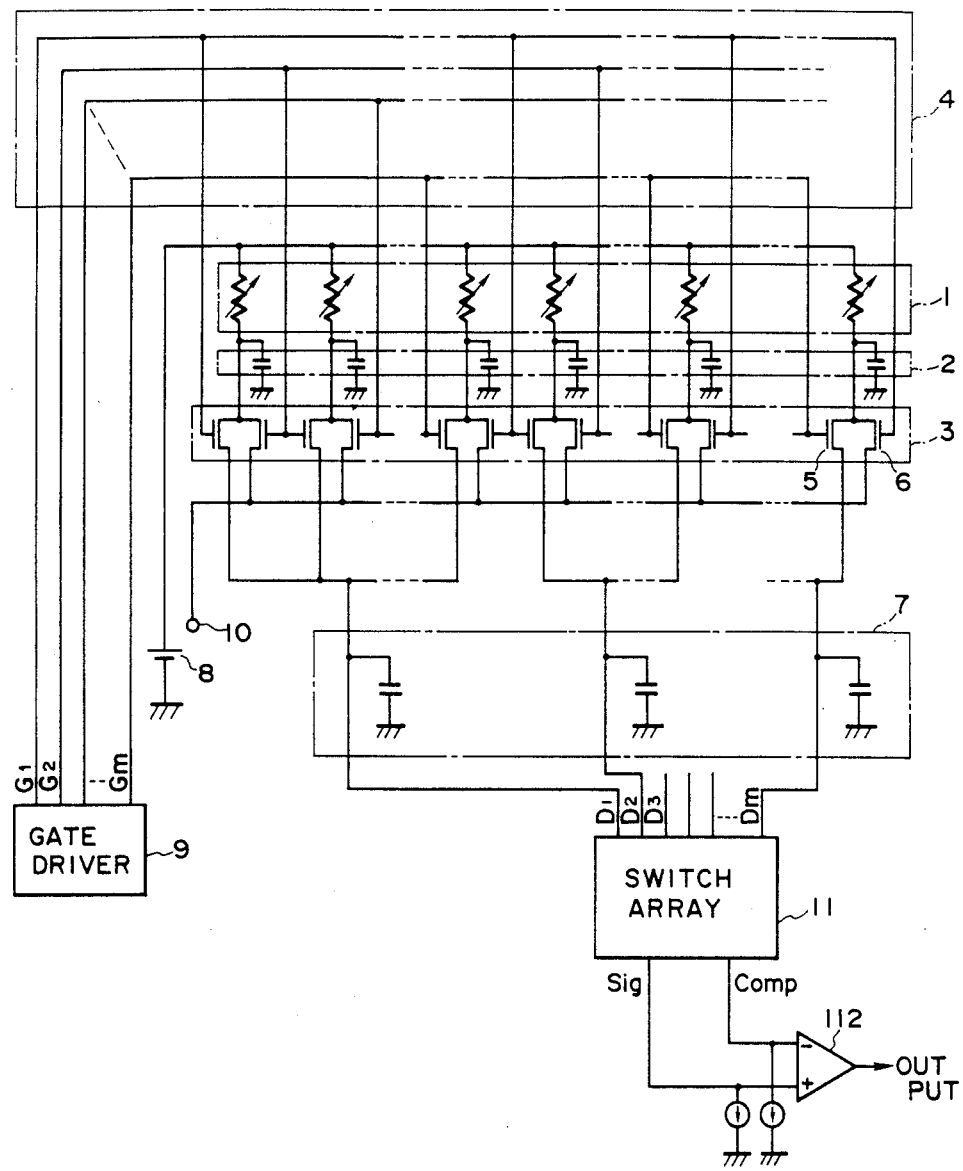
FIG. 2 is a circuit diagram showing a photoelectric conversion apparatus according to an embodiment of the present invention.

FIG. 2 is a circuit diagram showing the overall arrangement of a photoelectric conversion apparatus according to an embodiment of the present invention.

Referring to FIG. 2, photoconductive elements are used as photoelectric conversion elements arranged on a photoelectric conversion element unit 1. A capacitor unit 2 accumulates a charge corresponding to a photocurrent flowing through each photoelectric conversion element. In a switch element unit 3, two switch elements (i.e., a transfer switch element 5 and a reset switch element 6) are connected to each capacitor. In this embodiment, a TFT (thin film transistor) is used as the switch element. A matrix unit 4 performs a gate switching operation of the respective transistors in the switch element unit 3. Gate lines extending from the switch elements are divided into n blocks, each consisting of m lines. In the blocks, gate lines of identical bit numbers (1st bit line. 2nd bit line, ..., mth bit line) are respectively connected to a common gate line.

The transfer switch element 5 is used for transferring a charge accumulated in the capacitor. The reset switch element 6 is used for refreshing the capacitor after the charge is transferred by the transfer switch element 5.

Each capacitor in the capacitor unit 7 is connected to the corresponding transfer switch elements 5 which are commonly connected to each block, and accumulates a charge that is transferred through the switch elements 5. The photoelectric conversion apparatus shown in FIG. 2 also includes a power source 8 for applying a drive voltage to the photoelectric conversion elements, a gate driver 9 for driving the switch elements 5 and 6, a reset bias source 10 which is applied to the reset switch elements 6 for resetting the capacitors, a switch array 11 (to be described later) for serially outputting the charge which is transferred to the capacitor unit 7, and a differential amplifier 12 which is connected to two output terminals of the switch array 11.

This arrangement advantageously has a small crosstalk since a photocurrent flows through the photoelectric conversion unit 1 to which the drive voltage is applied from the power source 8, and a charge corresponding to the output from the unit 1 is accumulated on each capacitor of the capacitor unit 2.

The gates of the switch element unit 3 are sequentially turned on one by one for each block by the gate driver 9. Then, the corresponding transfer switch element 5 is turned on, and the reset switch element 6 of the preceding bit is also turned on. As a result, the charge on the corresponding capacitor is charged in the capacitor unit 7 through the corresponding switch element 5, and the capacitor of the preceding bit is refreshed. The charge accumulated on the capacitor unit 7 is serially output to the differential amplifier 12 by the switch array 11, as will be described below.

Figure 3:
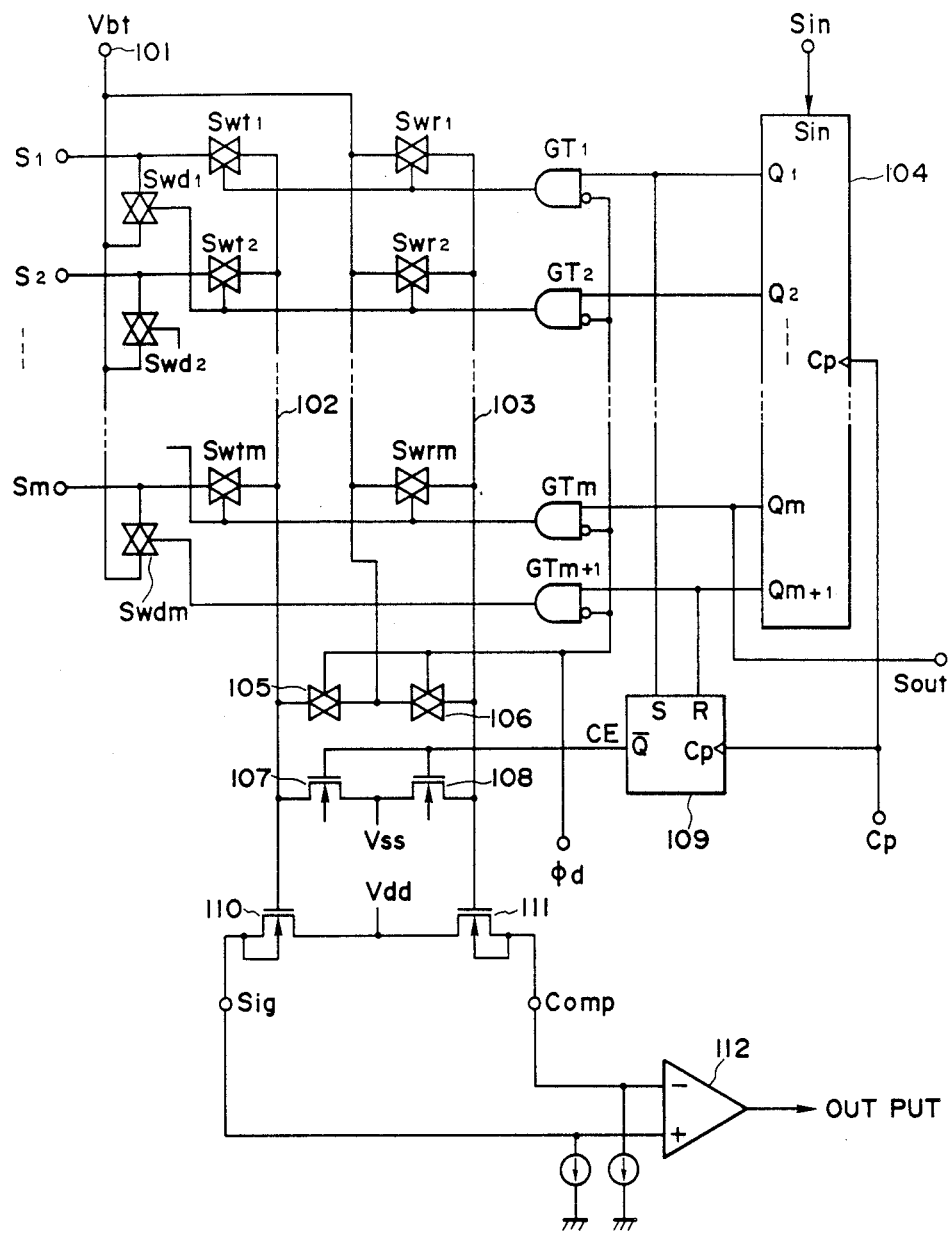
FIG. 3 is a circuit diagram showing a switch array according to an embodiment of the present invention.

FIG. 3 is a circuit diagram showing the switch array of this embodiment.

In FIG. 3, signal input terminals S1 to Sm are respectively connected to a reset bias terminal 101 through reset analog switches SWdl to SWdm. A voltage Vbt is applied to the reset bias terminal 101. The signal input terminals S1 to Sm are respectively connected to a common signal line 102 through analog switches SWtl to SWtm.

Analog switches SWrl to SWrm are arranged in correspondence with the analog switches SWtl to SWtm. One end of each of these switches is connected to the reset bias terminal 101, and the other end is connected to a common line 103.

Control terminals of the analog switches SWtl to SWtm and SWrl to SWrm of the corresponding bits are commonly connected to the corresponding output terminals of gate circuits GT1 to GTm. The control terminals of the reset analog switches SWdl to SWdm are the output terminals of the gate circuits GT2 to GTm+1 of the next bits.

The input terminals of the gate circuits GT1 to GTm+1 which are not logically negated are respectively connected to parallel output terminals Q1 to Qm+1 of a shift register 104, and the remaining logically negated input terminals commonly receive disable signal $\phi d$.

The disable signal $\phi d$ is also input to the control terminals of analog switches 105 and 106. On end of each of the analog switches 105 and 106 is respectively connected to the common signal line 102 and the common line 103, and the other end is connected to the reset bias terminal 101.

The common signal line 102 and the common line 103 are respectively connected to the drain terminal of transistors 107 and 108. The source terminals of these transistors receive a voltage Vss. The gate terminals of the transistors 107 and 108 are connected to a $\overline{Q}$ terminal of a flip-flop (to be referred to as an FF hereinafter) 109. A chip enable signal CE is output from the $\overline{Q}$ terminal. A set terminal S of the FF 109 is connected to an output terminal Q1 of the shift register 104, and a reset terminal R of the FF 109 is connected to an output terminal Qm+1 of the register 104.

The common signal line 102 and the common line 103 are respectively connected to the gate terminals of source-follower type field effect transistors 110 and 111. A voltage Vdd is applied to the drain terminals of these transistors 110 and 111. The source terminals of the transistors 110 and 111 are respectively connected to a Sig terminal and a Comp terminal As will be described later, signals from the signal input terminals S1 to Sm and a noise component due to the gate-source capacitance of the analog switches SWtl to SWtm sequentially appear at the Sig terminal. The noise component due to the gate-source capacitance of the analog switches SWrl to SWrm appears at the Comp terminal.

The Sig and Comp terminals are respectively connected to a noninverting terminal and an inverting terminal of a differential amplifier 112. The noise components due to the gate-source capacitances of the analog switches SWtl to SWtm and SWrl to SWrm are canceled by the differential amplifier 112, and the signals from the signal input terminals S1 to Sm are output from the output terminal of the amplifier 112.

The transistors 110 and 111 are biased and operated by the reset bias voltage Vbt. Therefore, if the voltage Vbt is appropriately set, the transistors 110 and 111 can be operated in a region with good linear transistor characteristics.

Since the switch array of this embodiment adopts a method for reading out a voltage appearing on the common signal line 102 and the common line 103, if the conductance gm of each analog switch exceeds a given value, the S/N ratio of the switch will not be impaired due to variations in conductance gm. The noise component due to the gate-source capacitance of each analog switch appears as a voltage shift because of a voltage read method, and can be easily canceled.

As will be described later, the source-follower type transistors 110 and 111 serve as buffers. Therefore, if a large number of switch arrays of this embodiment are connected, the Sig and Comp terminals can be connected in a wired-OR manner, and can be input to the differential amplifier 112.

The operation of the switch array having the above arrangement will now be described with reference to FIG. 4.

Figure 4:
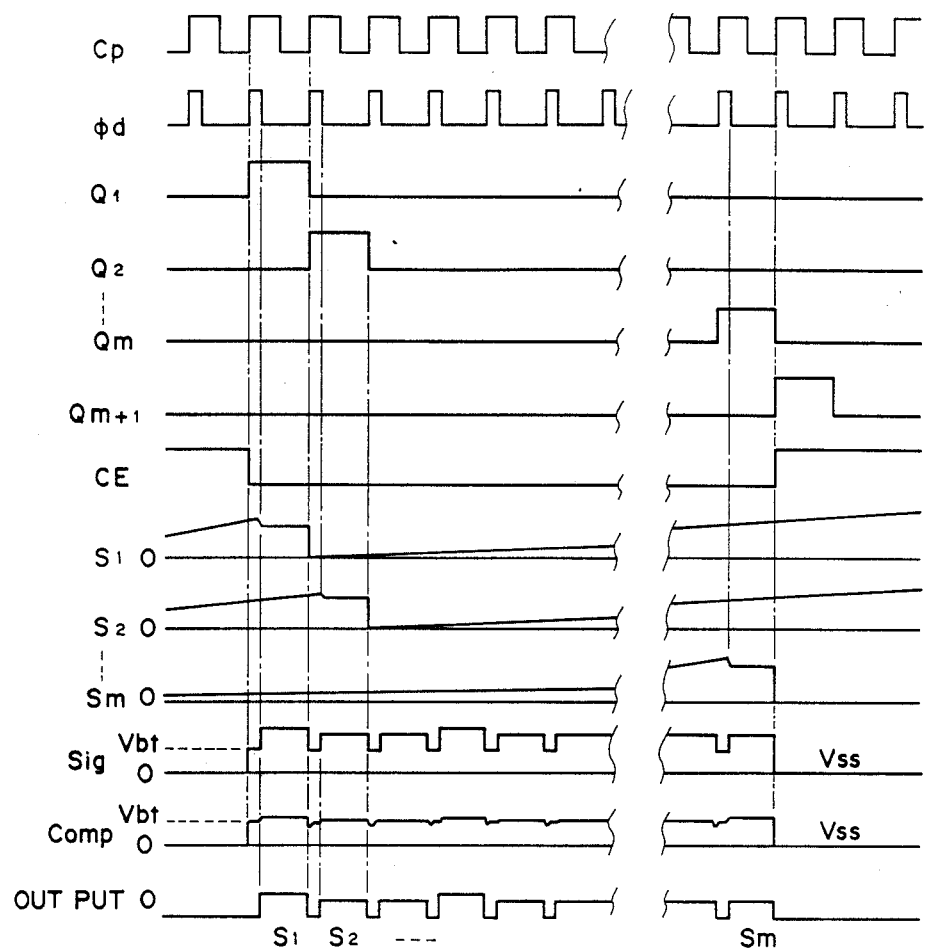
FIG. 4 is a waveform chart for explaining the operation of the switch array.

FIG. 4 is a waveform chart for explaining the operation of the switch array.

In this case, the signal input terminals S1 to Sm are connected to the same photoconductive type sensors as in the prior art apparatus. However, the present invention is not limited to the photoconductive type sensor, and a photodiode type sensor can be adopted. In this case, a parallel input signal to be converted to a serial output need only be obtained.

A clock pulse signal Cp is input to the shift register 104 and the FF 109, and the disable signal $\phi d$ which is synchronous with the clock pulse signal Cp and has a small pulse width is input to the gate circuits GT1 to GTm+1 and the analog switches 105 and 106.

When a start pulse is input to a Sin terminal of the shift register 104 in this state, an H-level output is produced from the output terminal Q1 in response to the clock pulse signal Cp.

The H-level signal is input to the gate circuit GT1. At this time, since the disable signal $\phi d$ is at H level, the gate signal GT1 is kept off. Therefore, the analog switches SWtl and SWrl are kept off. The analog switches 105 and 106 are turned on in response to the H-level disable signal $\phi d$, so as to respectively set the common signal line 102 and the common line 103 at the reset bias voltage Vbt.

At the same time, the H-level signal from the output terminal Q1 is input to the set terminal S of the FF 109. Thus, an L-level output appears from the output terminal $\overline{Q}$ of the FF 109 as the chip enable signal CE, thereby turning off the transistors 07 and 108.

When the disable signal φd goes to L level, the gate circuit GT1 is turned on, and the analog switches 105 and 106 are turned off.

The H-level signal from the output terminal Q1 of the shift register 104 is input to the control terminals of the analog switches SWtl and SWrl through the gate circuit GT1, thereby turning on these analog switches. When the analog switch SWtl is turned on, an output voltage which is input from, the photo-conductive type sensor to the signal input terminal S1 is read out on the common signal line 102. At the same time, since the analog switch SWrl is turned on, a noise component equivalent to that of the analog switch SWtl appears on the common line 103 as a voltage shift from the reset bias voltage Vbt.

The voltage appearing on the common signal line 102 is input to the differential amplifier 112 through the transistor 110. Meanwhile, the voltage appearing on the common line 103 is input to the differential amplifier 112 through the transistor 111. A difference between these voltages is obtained by the differential amplifier 112, so that a 1st-bit signal from the signal input terminal S1 from which the noise component due to the analog switch is canceled, can be output.

An H-level output is then produced from the output terminal Q2 of the shift register 104, and a 2nd-bit signal from the signal input terminal S2 is output in the same manner as the 1st bit. In this case. the analog switch SWdl of the 1st bit is turned on in response to the output from the gate circuit GT2, and the signal input terminal S1 is reset to the voltage Vbt.

The above operation is repeated until the mth-bit signal from the signal input terminal Sm is output, and the outputs from the photoconductive type sensors are serially output. In this case, when an H-level output is produced from the output terminal Qm of the shift register 104, the H-level signal is output from the Sout terminal to the Sin terminal of the next switch array apparatus.

When an H-level output is produded from the output terminal Qm+1 of the shift register 104, the analog switch SWdm is turned on, so that the signal input terminal Sm is reset to the voltage Vbt, and the FF 109 is also reset. Thus, the H-level output is produced as the chip enable signal CE, thereby turning on the transistors 107 and 108. The common signal line 102 and the common line 103 are fixed at the voltage Vss (in this case, a ground potential). and the source-follower type transistors 110 and 111 are turned off.

Note that the analog switches 105 and 106, and the transistors 107 and 108 are simultaneously turned on in response to the disable signal φd and the chip enable signal CE. In this case, the transistors 110 and 111 are turned off. Of course, the analog switches 105 and 106 can always be turned off when the chip enable signal CE is at H level.

Figure 5:
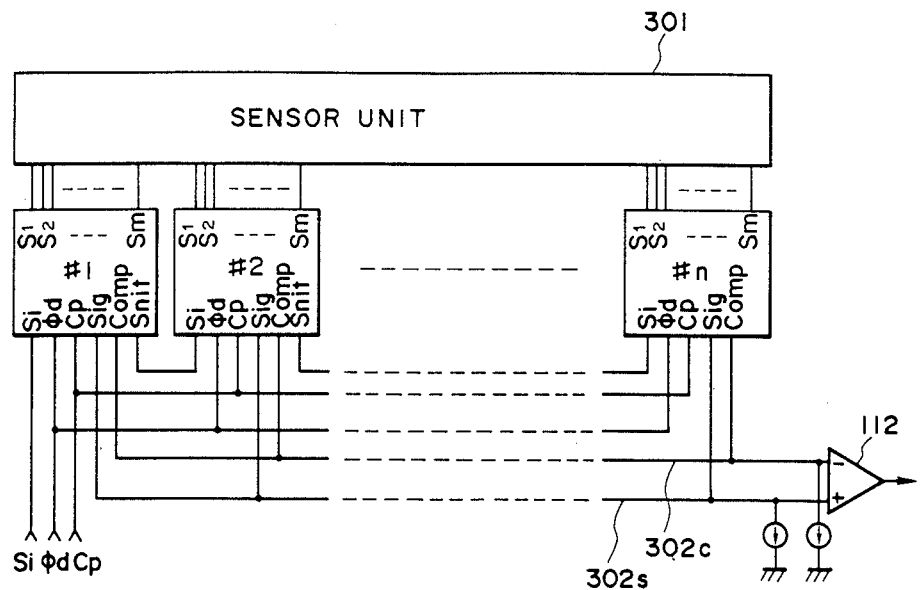
FIG. 5 is a diagram schematically showing a photoelectric conversion apparatus in which n apparatuses according to an embodiment of the present inventions are parallel-connected.

FIG. 5 is a schematic diagram of a photoelectric conversion apparatus, in which n switch arrays of the above embodiment are parallel-connected.

Referring to FIG. 5, in a sensor unit 301, photosensors and capacitors are arranged in an m x n matrix as in the prior art apparatus, and the output terminals of the photosensors are connected to corresponding signal input terminals S1 to Sm of switch array apparatuses according to the embodiment of the present invention. Sig and Comp terminals of switch arrays #1 to #n are respectively connected to the input terminals of a differential amplifier 112 through common lines 302s and 302c. More specifically, the photosensors of the unit 301 are divided into n blocks, and the sensor outputs from the respective blocks are sequentially serial-output to the differential amplifier 112 from the corresponding Sig and Comp terminals. When the read operation of the switch array #1 is completed, the H-level signal is output to the next switch array #2 from the Sout terminal, as described above. Subsequently, the read operation of the second block is performed by the switch array #2. As described above, since the buffers (transistors 110 and 111) of the switch other than the switch array #2 are kept off, the outputs from the Sig and Comp terminals of the switch array #2 can be input to the differential amplifier 112 without being influenced by other outputs. Similarly the sensor outputs from the entire sensor unit 301 are serially output from the differential amplifier 112.

Figure 6:
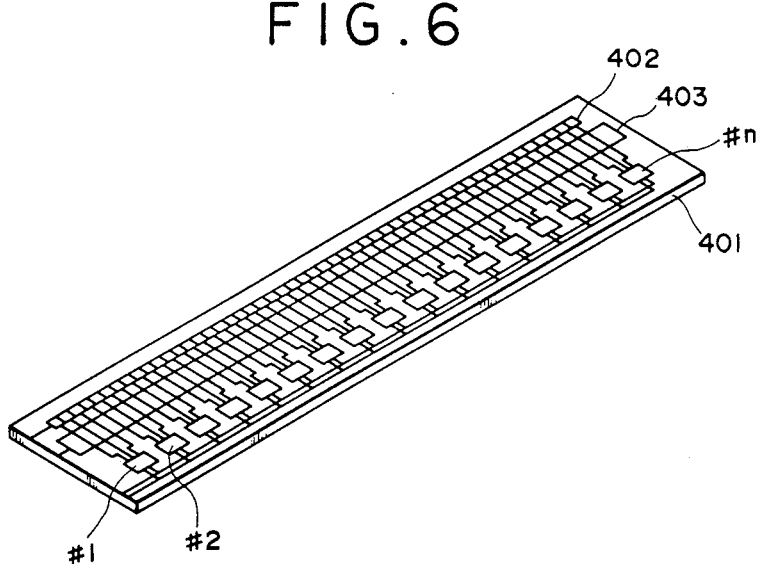
FIG. 6 is a perspective view schematically showing the photoelectric conversion apparatus shown in FIG. 5.

FIG. 6 is a perspective view schematically showing the photoelectric conversion apparatus shown in FIG. 5.

Referring to FIG. 6, photosensors 402 are arranged on a substrate 401, and capacitors 403 are constituted by utilizing electrodes which individually extend from the photosensors 402. The photosensors 402 and the capacitors 403 constitute the sensor unit 301 shown in FIG. 1. In addition, m electrodes are connected to each of the switch arrays #1 to #n, respectively.

Figure 7A:
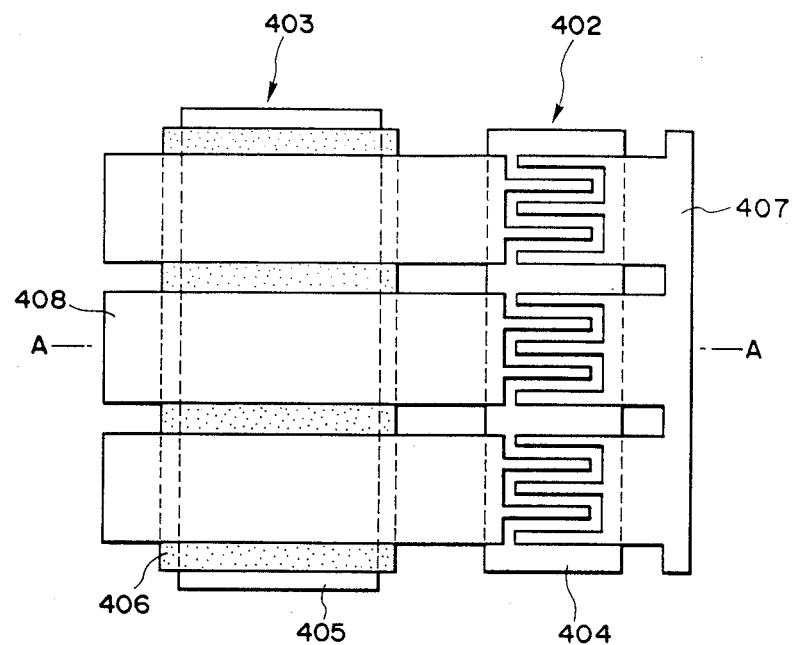
FIG. 7(A) is a plan view showing some photosensors and capacitors arranged on the photoelectric conversion apparatus.
Figure 7B:
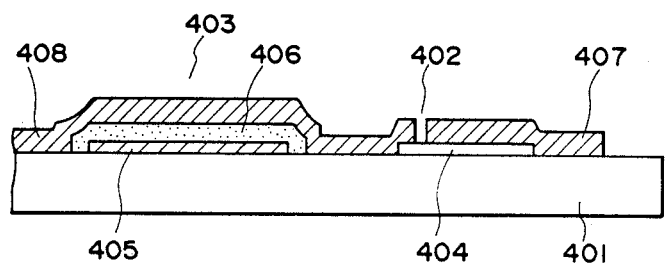
FIG. 7(B) is a sectional view taken along a line A—A in FIG. 7(A).

FIG. 7(A) is a plan view showing some photosensors and capacitors in the photoelectric conversion apparatus, and FIG. 7(B) is a sectional view taken along a line A—A in FIG. 7(A).

Referring to FIGS. 7(A) and 7(B), a photoconductive layer 404 such as amorphous silicon, Cds, or the like, and an electrode 405 constituting the capacitors are formed on a substrate 401 such as glass, ceramic, or the like. After an insulating layer 406 such as $SiO_2$, SiNH, or $Ta_2O_3$ on the electrode 405, a common electrode 407 for the photosensors 402 is formed on the photoconductive layer 404, and individual electrodes 408 are formed on the photoconductive layer 404 and the insulating layer 406. Gaps between the common electrode 407 and the individual electrode 408 are formed in a comb shape in order to increase the area of a photoelectric conversion region. The electrodes are formed of Al, Cr, Mo, or the like.

According to the photoelectric conversion apparatus of the above embodiment, as described above, the same noise component as in a first switch means is generated by a second switch means which is synchronously operated with the first switch means, and this noise component is eliminated by a differential amplifier means. Therefore, a serial readout signal having a high S/N ratio which accurately corresponds to a matrix-transferred signal can be obtained from the output of the differential amplifier means.

A matrix wiring unit is arranged so as not to cross the signal lines extending from the capacitors. Therefore, a good readout signal without crosstalk can be obtained.

In the switch array apparatus of the above embodiment, since first and second readout means adopt a voltage read method, the S/N ratio of the readout signal will not be decreased due to variations in conductances of the first and second switch means. Since voltage read method is adapted. the noise components from the first and second switch means appear as a shift of voltage level, and the noise reduction can be easily performed by the differential amplifier means.

Therefore, a parallel input signal can be converted to a serial output signal without being influenced by the switching operation, and an output signal having a high S/N ratio can be obtained.

In the switch array apparatus of the above embodiment, a reset bias means is arranged so as to reset to a bias level parallel input signals and a common signal line and a common line for transferring the parallel input signals, so that the first and second readout means have linear output characteristics. Thus, output signals which precisely correspond to signal inputs through the common signal line and the common line can be input to the differential amplifier means. Since the bias voltage can be removed by the differential amplifier means, the serial output signal precisely corresponding to the parallel input signal can be obtained.

Since first and second readout means adopt a voltage read method, the S/N ratio of the readout signal will not be decreased due to variations in conductances of the first and second switch means.

Since the voltage read method is adapted, the noise components from the first and second switch means appear as a shift of voltage level, and the noise reduction can be easily performed by the differential amplifier means.

Therefore, a parallel input signal can be converted to a serial output signal without being influenced by the switching operation, and an output signal having a high S/N ratio can be obtained.

In the switch array apparatus of the above embodiment, the same noise component as in a first switch means is generated by a second switch means which is synchronously operated with the first switch means, and this noise component is eliminated by a differential amplifier means. Therefore, a serial readout signal having a high S/N ratio which accurately corresponds to a matrix-transferred signal can be obtained from the output of the differential amplifier means.

In the switch array apparatus of the above embodiment, since the outputs from the first and second switch mean are sent to the differential amplifier means through the first and second buffer means, a plurality of switch arrays each of which is constituted by the first and second buffer means and the first and second switch means can be parallel-connected in a wired-OR manner. Therefore, if there are a large number of parallel inputs, serial output signals having a high S/N ratio can be obtained.

The same noise component as in a first switch means is generated by a second switch means which is synchronously operated with the first switch means, and this noise component is eliminated by a differential amplifier means. Therefore, a serial readout signal having a high S/N ratio which accurately corresponds to a matrix-transferred signal can be obtained from the output of the differential amplifier means.

We claim:

1. Apparatus for a photoelectric conversion device having a signal accumulated in a capacitor provided for each of a plurality of photoelectric conversion elements, signal lines extending from the capacitors, comprising:

a matrix wiring unit arranged opposite the photoelectric conversion elements so as not to cross the signal lines extending from said capacitors, for transferring the signals from said capacitors; and switch array means for serially outputting the transferred signals, said switch array means comprising:

(a) signal switch means having a plurality of inputs for receiving the transferred signals, said signal switch means being connected to a signal output line;

(b) reference switch means connected to a reference output line;

(c) differential amplifier means coupled to said signal output line and to said reference output line for receiving a first voltage signal outputted from said signal switch means and a second voltage signal outputted from said reference switch means, and for outputting an output signal that corresponds to signal levels of the transferred signals;

(d) voltage reset means connected to said signal output line and to said reference output line;

(e) voltage responsive signal read-out means coupled between said differential amplifier means and said signal output line for conducting voltage-reading of an output of said signal output line; and (f) voltage responsive reference read-out means coupled between said differential amplifier means and said reference output line for conducting voltage-reading of an output of said reference output line; and wherein said signal switch means and said reference switch means are synchronously operated so that the output read by said voltage responsive signal read-out means and the output read by said voltage responsive reference read-out means are inputted into said differential amplifier means.

2. An apparatus according to claim 1, wherein said voltage responsive signal read-out means and said voltage responsive reference read-out means each comprise source-follower type field effect transistors.

3. A switch array apparatus for a photoelectric converting device and for converting parallel input signals into a serial output signal, comprising:

signal switch means having a plurality of inputs for receiving said parallel input signals, said signal switch means being connected to a signal output line;

reference switch means connected to a reference output line; and a differential amplifier means coupled to said signal output line and to said reference output line for receiving a first voltage signal outputted from said signal switch means, and a second voltage signal outputted from said reference switch means, to provide an output signal that corresponds to signal levels of the parallel input signals;

voltage reset means connected to said signal output line and said reference output line;

voltage responsive signal read-out means coupled between said differential amplifier means and said signal output line or conducting voltage-reading of an output of said signal output line; and voltage responsive reference read-out means coupled between said differential amplifier means and said reference output line for conducting voltage-reading of an output of said reference output line; and wherein said signal switch means and said reference switch means are synchronously operated so that the output read by said voltage responsive signal read-out means and the output read by said voltage responsive reference read-out means are inputted into said differential amplifier means.

4. An apparatus according to claim 3, wherein said voltage responsive signal read-out means and said voltage responsive reference read-out means each comprise source-follower type field effect transistors.

5. A switch array apparatus for converting parallel input signals into a serial output signal, comprising:

signal switch means having a plurality of inputs for receiving said parallel input signals, said signal switch means being connected to a signal output line;

reference switch means connected to a reference output line;

differential amplifier means coupled to said signal output line and to said reference output line for receiving a first voltage signal outputted from said signal switch means, and a second voltage signal outputted from said reference switch mean, so as to provide an output signal that corresponds to signal levels of the parallel input signals;

voltage reset means connected to said signal output line and said reference output line;

voltage responsive signal read-out means coupled between said differential amplifier means and said signal output line for conducting voltage-reading of an output of said signal output line; and voltage responsive reference read-out means coupled between said differential amplifier means and said reference output line for conducting voltage-reading of an output of said reference output line;

wherein said signal switch means and said reference switch means are synchronously operated so that the output read by said voltage responsive signal read-out means and the output read by said voltage responsive reference read-out means are inputted into said diffeerential amplifier means; and reset bias means for, before the input signals are transferred to said signal output line, resetting a level of the input signal and the signal and reference output lines to a bias potential so that said readout voltage reference read-out means have linear input/output characteristics.

6. An apparatus according to claim 5, wherein said voltage responsive signal read-out means sand said voltage responsive reference read-out means each comrpise source-follower type field effect transistors.

7. A photoelectric conversion apparatus, comprising:

a photoelectric conversion unit having a plurality of photoelectric conversion elements outputting a plurality oof parallel signals;

signal switch means having a plurality of inputs for receiving said parallel input signals, said signal switch means being connected to a signal output line;

reference switch means conencted to a reference output line;

differential amplifier means coupled to said signal output line and to said reference output line for receiving a first voltage signal outputted from said signal switch means, and a second voltage signal outputted from said reference switch means, to provide an output signal that corresponds to signal levels of the parallel input signals;

voltage reset means connected to said signal output line and to said reference output line;

voltage responsive signal read-out means coupled between said differential amplifier means and said signal output line for conducting voltage-reading of an output of said signal output line; and voltage responsive reference read-out means coupled between said differential amplifier means and said reference output line for conducting voltage-reading of an output of said reference output line; and wherein said signal siwtch means and said reference switch means are synchronously operated so that the output read by said voltage responsive signal read-out means and the output read by said voltage responsive reference read-out means are inputted into said differential amplifier means.

8. An apparatus according to claim 7, wherein said voltage responsive signal read-out means and said voltage responsive reference read-out means each comprise source-follower type field effect transistors.

* * * * *

UNITED STATES PATENT AND TRADEMARK OFFICE
CERTIFICATE OF CORRECTION

PATENT NO. : 4,965,570                                Page 1 of 3

DATED : October 23, 1990

INVENTOR(S) : Katsunori Hatanaka, et al.

It is certified that error appears in the above-identified patent and that said Letters Patent is hereby corrected as shown below:

FIG. 1 (Sheet 1):

Box 702, "RESISTER" should read --REGISTER--.

COLUMN 1:

Line 1, "COONVERSION" should read --CONVERSION--.

Line 6, "field" should read --filed--.

Figure 1:
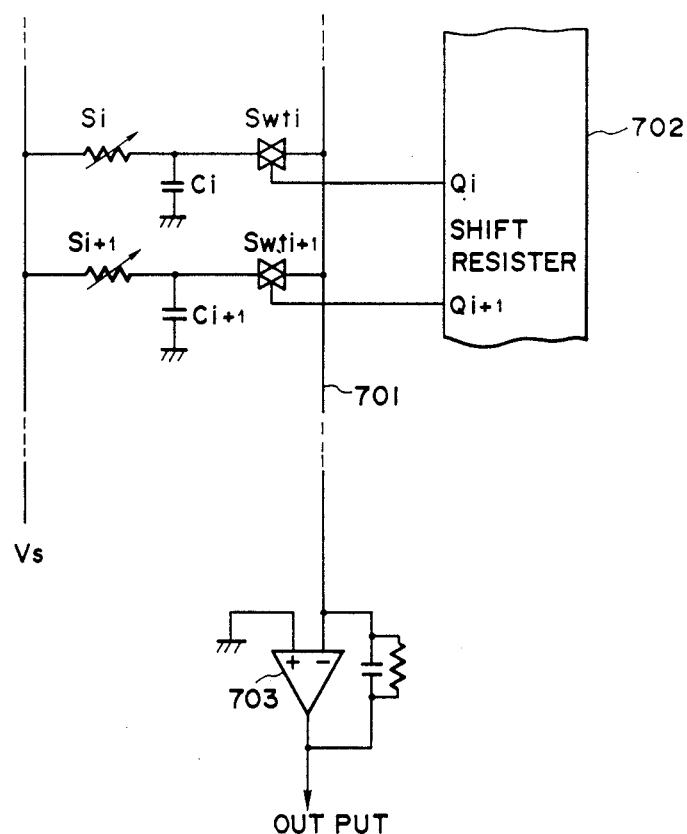
FIG. 1 is a circuit diagram schematically showing part of a conventional photoelectric conversion apparatus.

Line 20, "FIG. 1" should read --FIG. 1,--.

Line 27, "on" should read --in--.

COLUMN 2:

Line 15, "inventions" should read --invention--.

COLUMN 3:

Line 66, "terminal As" should read --terminal. As--.

COLUMN 4:

Line 68, "transistors 07 and 108." should read --transistors 107 and 108.--.

UNITED STATES PATENT AND TRADEMARK OFFICE
CERTIFICATE OF CORRECTION

PATENT NO. : 4,965,570

DATED : October 23, 1990

INVENTOR(S) : Katsunori Hatanaka, et al.

It is certified that error appears in the above-identified patent and that said Letters Patent is hereby corrected as shown below:

COLUMN 5:

Line 7, "switches" should read --switches.--.

Line 9, "from," should read --from--.

Line 40, "produded" should read --produced--.

COLUMN 6:

Line 11, "switch other" should read --switch arrays other--.

Line 37, "$Ta_2O_3$ on" should read --$Ta_2O_3$ is formed on--.

COLUMN 8:

Line 46, "a" should be deleted.

Line 57, "or" should read --for--.

UNITED STATES PATENT AND TRADEMARK OFFICE
CERTIFICATE OF CORRECTION

PATENT NO. : 4,965,570

DATED : October 23, 1990

INVENTOR(S) : Katsunori Hatanaka, et al.

It is certified that error appears in the above-identified patent and that said Letters Patent is hereby corrected as shown below:

COLUMN 9:

Line 17, "reference switch mean," should read --reference switch means,--.

Line 36, "diffeerential" should read --differential--.

Line 40, "readout voltage" should read --readout voltage responsive signal read-out means and said voltage responsive--.

COLUMN 10:

Line 2, "sand" should read --and--.

Line 8, "oof" should read --of--.

Line 32, "siwitch" should read --switch--.

Signed and Sealed this

Twelfth Day of May, 1992

Attest:

DOUGLAS B. COMER

*Attesting Officer*     *Acting Commissioner of Patents and Trademarks*